(12) United States Patent
Cleary

(10) Patent No.: US 8,962,337 B2
(45) Date of Patent: Feb. 24, 2015

(54) MARKER SYSTEM

(75) Inventor: Michael Cleary, London (GB)

(73) Assignee: Smartwater Research Limited (GB)

( * ) Notice: Subject to any disclaimer, the term of this patent is extended or adjusted under 35 U.S.C. 154(b) by 0 days.

(21) Appl. No.: 13/639,096

(22) PCT Filed: Mar. 30, 2012

(86) PCT No.: PCT/GB2012/050730
§ 371 (c)(1),
(2), (4) Date: Jan. 8, 2013

(87) PCT Pub. No.: WO2012/131397
PCT Pub. Date: Oct. 4, 2012

(65) Prior Publication Data
US 2014/0008581 A1  Jan. 9, 2014

(30) Foreign Application Priority Data
Mar. 30, 2011 (GB) .................................. 1105373.3

(51) Int. Cl.
*G01N 33/00* (2006.01)
*C09D 7/12* (2006.01)
*C09D 5/18* (2006.01)
*C08K 3/40* (2006.01)

(52) U.S. Cl.
CPC ................ *C09D 7/1216* (2013.01); *C09D 5/18* (2013.01); *C08K 3/40* (2013.01)
USPC .............. 436/56; 422/400; 422/401; 422/402

(58) Field of Classification Search
USPC ......................................... 422/400, 401, 402
See application file for complete search history.

(56) References Cited

U.S. PATENT DOCUMENTS

| 6,238,847 B1 | 5/2001 | Axtell, III et al. |
| 2008/0096024 A1 * | 4/2008 | Cavallin ........................ 428/426 |

FOREIGN PATENT DOCUMENTS

| EP | 1116755 A1 | 7/2001 |
| GB | 1283805 | 8/1972 |
| JP | 09118066 A | 5/1997 |
| WO | 2006044455 A1 | 4/2006 |

* cited by examiner

*Primary Examiner* — Sam P Siefke
(74) *Attorney, Agent, or Firm* — Burns & Levinson LLP; Joseph M. Maraia; Nikhil Patel

(57) ABSTRACT

A marker system for applying to surfaces of items, articles, goods, vehicles and/or premises, said marker system comprising: a marker comprising a temperature resilient medium having a predefined carbonization temperature capable of securing the marker system onto a surface; wherein the medium contains an inorganic matrix having a predefined fusing point lower than the predefined carbonization temperature of the medium; such that when the marker system is subjected to temperatures above the predefined carbonization temperature of the medium, the inorganic matrix fuses to the marker to form an adhesive protective layer thereby securing the marker onto said surface. A composition comprising the marker system. An item, an article, a good, a vehicle and/or premises comprising a surface impregnated with the marker system.

19 Claims, No Drawings

MARKER SYSTEM

RELATED APPLICATIONS

This application is the U.S. National Stage of International Application No. PCT/GB2012/050730, filed on Mar. 30, 2012, published in English, which claims priority to Great Britain Patent Application No. GB 1105373.3, filed Mar. 30, 2011, the entire teachings of the above applications are incorporated herein by reference.

FIELD OF THE INVENTION

The present invention relates to an improved marker system for use in the security and tracing of items, articles, goods, vehicles or persons. In particular, the invention described herein is directed towards an improved marker system capable of withstanding high temperatures.

BACKGROUND TO THE INVENTION

Generally, non-ferrous metals are expensive materials and their price is steadily increasing. As a result theft of such metal items is on the incline. Such metals, for example copper and aluminium are often used in cabling, in rail networks and telecommunications. Accordingly, the theft of such metal items is particularly costly for the party suffering the loss, not only due to the high value of the materials involved but the ensuing loss due to disruption of business and infrastructure can be orders of magnitude higher.

There is therefore a need to prevent or at least reduce the level of such theft. A way of doing this is to provide a mark on the material which establishes proof of ownership. In this way theft can be established and charges brought against those in possession of items which could positively be identified as stolen.

In recent years, the use of marker systems has been particularly useful in preventing crime and for tracking and identifying the authenticity of items. Such marker systems, as have been developed by the applicant for many years, have found particular application in the fields of security and crime prevention/deterrence, for example as described in WO 93/07233, GB 2369078, GB 2410208 and GB 2413675, amongst others. Analysis of the surface onto which the marker system is placed or deployed can provide a reliable method of tracing or authenticating items, articles, goods, vehicles or persons.

An important feature of a marker system is its stability under varying conditions. These conditions can involve excesses due to weather or chemical assault and deliberate attempts to remove the marker from marked items. Additionally, where the stolen goods comprise metal or metallic compounds, it is common that the items will be subjected to heat either to alter the shape or look of the goods or alternatively to remove any non-metallic material therefrom, such as for example insulating material that surrounds cabling.

Copper and aluminium are used extensively in cabling due to their electrical and thermal properties. Aluminium melts at 660° C. and copper at 1084° C. At present, it is not possible to identify such metals as stolen if they have been subjected to very high temperatures in order for example to try and remove a security mark applied thereto. Any indicator or security mark which is capable of identifying such metal items would need to be able to function subsequent to the application of such high temperatures. For example, when electrical cable is subjected to high temperatures to burn off the insulation, the former occurs at quite a low relative temperature unlike the latter which can occur at temperatures over 1000° C.

Given that most metals which are stolen will be subjected to heat at various stages, a marker for use on metals must be capable of withstanding the type of temperatures to which the stolen metal might be subjected.

Therefore, there is a need for a marker system capable of withstanding high temperatures so that marker and consequently the goods remain identifiable.

In a first aspect of the invention, there is provided a covert marker system for applying to surfaces of items, articles, goods, vehicles and/or premises, said marker system comprising: a marker comprising a temperature resilient medium having a predefined carbonisation or melting temperature and capable of securing the marker system onto a surface; wherein the medium contains an inorganic matrix having a predefined fusing point lower than the predefined carbonisation temperature of the medium; such that when the marker system is subjected to temperatures above the predefined carbonisation temperature of the medium, the inorganic matrix fuses to the marker to form an adhesive protective layer thereby securing the marker onto said surface.

In one embodiment of the invention, the inorganic matrix is ground glass and preferably a finely ground glass. In one embodiment the glass constitutes approximately 20% wt/wt of the matrix.

In one embodiment of the invention the organic medium present in the formulation is an aqueous acrylate emulsion and which advantageously comprises a material having a high inherent stability that is resistant to environmental conditions and/or removal through washing or abrasion.

In a preferred embodiment of the invention the marker comprises a fingerprint and which is preferably an organo-metalic fingerprint. Preferably, the fingerprint comprises a unique identifying tracer.

In another preferred embodiment of the invention the marker further comprises an indicator which may, for example, be an inorganic indicator. Preferably, the indicator comprises at least one phosphorescent or fluorescent material capable of phosphorescing or fluorescing at particular wavelengths when subjected to a particular stimulus. Preferably, the indicator comprises at least one material capable of phosphorescing or fluorescing when subjected to an infrared or ultraviolet stimulus.

In accordance with the present invention, the matrix is such that it is capable of preserving the integrity of the markers at high temperatures, preferably in excess of 1000° C.

In one embodiment of the invention, the marker system is provided in a sprayable form.

An item, an article, a good, a vehicle and/or premises comprising a surface coated or otherwise impregnated with the marker system also forms part of the present invention.

The invention will now be further described with reference to the following exemplary embodiment.

Matrix

The marker system includes a matrix and an aqueous polymer emulsion to bind a marker to the surfaces of items, articles, goods, vehicles and/or premises. Advantageously, the polymer system, which is water based to avoid the use of solvents, initially acts as an adhesive to secure the marker or surface coating to the goods being protected. As the goods may be subject to high temperatures, it is desirable for the matrix to be able to withstand high temperatures; failing which, the matrix may lose its adhesion to the surface, by for example carbonising, and the marker system will simply fall off the surface, when the marker system is subjected, either directly or indirectly, to high temperatures. In order to ensure that a stolen item is identifiable even where it has been subjected to heat; it is desirable for the polymer emulsion and matrix combination to secure the marker system across a wide range of temperatures.

To determine a suitable composition to use as an inorganic matrix, various systems have been tested; particularly, systems based on silicones and silanes were tested. These systems demonstrated the advantage of not darkening when the marker system was subjected to heat. However, during testing, none of these systems maintained their adhesion to the substrate leaving the marker system free to just fall from the marked item.

In order for the matrix to be capable of securing the marker to a surface across a range of temperatures, i.e. to over 1000° C., the present application provides for an inorganic matrix, typically a glass as one of its components. When heat is applied to glass, the glass softens. As the glass softens, it becomes more fluid and sticky. When the softened glass is subsequently cooled, the glass with reform into a solid and anything which was fused to it will be encapsulated in a glass layer; for example, the marker and the surface of the item on which the marker system has been secured.

The present invention provides a matrix which comprises preferably a composition of a glass in a medium. This composition of matrix was found to be particularly effective in securing the marker to the surface when the surface was subjected to high temperatures. In one embodiment of the invention, the medium is a polymer emulsion, i.e. an acrylate emulsion, which at low temperatures holds the glass powder in place. It is only at higher temperatures that the two roles are reversed.

A preferred composition of the matrix comprises a composition of ground glass in an organic medium. The carbonisation temperature of the organic medium and the fusing point of the glass are known. In fact, the organic medium and the glass may be selected from a range of compositions based on the range desired. Particularly, the selection may be made such that the predefined fusing point of the glass is lower than the carbonisation temperature of the medium.

One advantage of selecting a glass having a predefined fusing point lower than the carbonisation temperature of the medium is that when the adhesive properties of the medium start to decrease, because the carbonisation temperature of the medium is being approached or has passed, the fusing point of the glass will also have passed such that the glass will stick to the marker as well as the surface. This therefore ensures that the marker is securely placed on the particular surface across a range of temperatures.

Marker

The marker detailed above may further comprise a fingerprint and/or an indicator. It is preferable that each of the components of the marker is also capable of withstanding or are resilient to high temperatures.

Fingerprint

The marker preferably comprises a unique fingerprint capable of distinguishing one marker system from that of another and to identify the source of the item to which it is coupled. The fingerprint may comprise a solvent medium containing a volatile component, together with for example one or more trace materials which can be varied in such a manner as to produce unique formulations. The combinations of trace materials may advantageously be varied by modelling the compositions on, for example, binary strings to produce large numbers of unique products. However, other suitable coding methodologies may also be utilised as appropriate. The term "trace materials" applies herein to materials which would not normally be present in the environment of use. The most commonly used trace materials are metal compounds.

Trace materials can advantageously therefore be combined in a way which gives good evidential value to law enforcement agencies, as each unique formulation may be allocated to a particular premises, location or person, and this information is stored in a central database which can be accessed by a law enforcement agency receiving the report of a laboratory analyzing the mixtures which are to be discussed.

The trace materials may be assigned constant positions in a binary string with their presence being given by a "1", and their absence by a "0". If, for example, one were to set a limit of thirty digits for the string, one could begin with combinations of two trace materials, and generate all combinations containing any two trace materials. One could then go to groups of three trace materials, and generate all combinations of any three trace materials. This could continue until the number of trace materials is equal to the number of digits in the string.

With a thirty digit string, the total number of unique combinations of trace materials is approximately one billion. However, it is possible to prepare an infinite number of mixtures having compositions based upon unique binary sequences, the composition of each being unique.

Binary strings are provided as exemplary of the manufacturing procedures which can be used. Octal strings may also be used. Decimal numbers and random number generation can be used to generate potential codes, although these will need to be checked and converted to binary or octal sequences prior to use.

The unique nature of each composition can be checked during Quality Control following manufacture. The composition can then be stored in a database, allocated to a premises, location, or person, and the source of goods located at a later time can be traced to the premises, location or person via the composition.

Of course, the greater the number of trace materials used, the greater the certainty in identification later on, since the chance presence of trace materials can be ruled out.

To determine the fingerprint which was best able to withstand the effect of high temperatures, several different types of fingerprint were tested. Organic materials were carbonised at relatively low temperatures of less then 500° C.

In one embodiment of the invention, inorganic materials may be used as the fingerprint. These materials have the best performance, of the materials tested. However, the materials themselves were difficult to work with.

A preferred fingerprint for use in the invention is an organometallic material. During testing, these compounds yielded the best results as they were initially easy to work with and when subjected to high temperature, the organic burnt off leaving the metals as fingerprint.

Indicator

The marker preferably comprises an indicator material, which can quickly provide a preliminary, gross indication of the presence of a composition according to the invention. The indicator material can either be "overt" or "covert." An overt material is typically one which can be seen unaided by technology, such as a dye or pigment. With an overt indicator, it is immediately evident from an observation of the article or person that a mark has been provide thereon which may act as a deterrent. In one embodiment both a covert and overt mark may be applied thus combining the deterrent effect of the overt mark with the covert properties of the covert mark. For example, if the overt mark failed to act as a deterrent and the perpetrator tried to remove the overt mark; even if they were successful the stolen item could nevertheless still be identified by virtue of the covert mark.

A covert indicator will remain hidden until some technical means or stimulus is used to make it obvious. Usually, a covert indicator will become visible upon application of a radiation source other than visible light, and of these, fluorescent indicators are most common. Thus, the covert indicator will often be at least one fluorescent material which is soluble in a solvent system, and which is easily detectable upon examination with ultraviolet light, for example.

It is possible to utilise a fluorescent material which when exposed to UV light fluoresces in a particular colour, each particular fluorescent material being selected for a particular customer, so that when the composition containing the selected fluorescent material is applied to a surface of articles or goods, then any unauthorised removal of such articles or goods can be linked back to the particular customer as the source of goods. It is further possible to utilise a combination of two or more fluorescent materials having differing λ max emission wavelengths.

It is possible to identify said two or more materials by utilising a UV-absorption spectrum or a fluorescent emission spectrum of an indicator. Accordingly, such combination of materials, when applied to a surface of articles or goods, can also be used to link the particular goods to the customer. Alternatively or additionally, the indicator may comprise at least one phosphorescent material capable of phosphorescing when subjected to stimulus.

The indicator is preferably utilised in spray form and can be combined with various solvent systems and surfactants. The indicator is suitably present in an amount of 0.1 to 40% by weight of the composition.

When the gross indicator means is fluorescent, the composition can include one or more of any suitable fluorescent materials.

In terms of suitable indicators, both organic and inorganic materials were tested. Some organics, especially of the oxazinone functionality performed well, but did still degrade well below the required temperature and lost their fluorescence.

A preferred compound for use in the invention as an indicator is an inorganic emitter. A range of inorganic emitters were tested and some of these did maintain a good fluorescent emission beyond 1000° C.

Marker System

Testing was performed for a marker system comprising an indicator, a fingerprint, and a matrix of 20% finely ground glass in an organic medium. The combination of these materials gave a marker that does stay operational and fully functional at temperatures in excess of 1000° C.

In an embodiment of the invention, this marker system may be applied to an article. In a preferred embodiment, the marker system is colourless, odourless and has no feel thereto, and is therefore undetectable.

A number of embodiments have been described herein. However, it will be understood by persons skilled in the art that other variants and modifications may be made without departing from the scope of the embodiments as defined in the claims appended hereto.

The invention claimed is:

1. A marker system for applying to surfaces of items, articles, goods, vehicles and/or premises, said marker system comprising:
    a marker comprising a temperature resilient medium, the marker having i) an aqueous polymer emulsion capable of securing the marker system onto a surface, ii) a predefined carbonisation temperature, wherein the temperature resilient medium includes an inorganic matrix having a predefined fusing point lower than the predefined carbonisation temperature of the temperature resilient medium, and iii) a fingerprint configured to distinguish one marker system from another and to identify a source of an item to which the marker is applied;
    the inorganic matrix configured to, in response to being subjected to temperatures above the predefined carbonisation temperature of the medium, fuse to the marker to form an adhesive protective layer thereby encapsulating the marker onto said surface.

2. The marker system of claim 1, wherein the adhesive layer substantially preserves the integrity of the marker.

3. The marker system of claim 1, wherein the inorganic matrix is a ground glass.

4. The marker system of claim 3, wherein the glass is a finely ground glass.

5. The marker system of claim 3, wherein the ground glass constitutes approximately 20% wt/wt of the marker.

6. The marker system of claim 1, wherein the medium is an organic medium.

7. The marker system of any claim 6, wherein the medium comprises an aqueous acrylate emulsion.

8. The marker system of claim 1, wherein the medium comprises a material having a high inherent stability that is resistant to environmental conditions and/or removal through washing or abrasion.

9. A marker system of claim 1, wherein the marker further comprises a fingerprint.

10. The marker system of claim 9, wherein the fingerprint is an organometalic fingerprint.

11. The marker system of claim 9, wherein the fingerprint comprises a unique identifying tracer.

12. The marker system of claim 1, wherein the marker further comprises an indicator.

13. The marker system of claim 12, wherein the indicator comprises an inorganic indicator.

14. The marker system of claim 12, wherein the indicator comprises at least one material capable of phosphorescing when subjected to stimulus.

15. The marker system of claim 12, wherein the indicator comprises at least one material capable of emitting visible or near infra red radiation at a specific frequency when subjected to infra-red stimulus.

16. The marker system of claim 12, wherein the indicator comprises at least one material capable of emitting visible or near infra red radiation when subjected to ultra-violet stimulus.

17. The marker system of claim 1, wherein the surfaces of items, articles, goods, vehicles and/or premises comprise metal surfaces.

18. The marker system of claim 1, wherein the matrix is capable of preserving the integrity of the markers at high temperatures.

19. The marker system of claim 18, wherein the high temperatures include temperatures in excess of 1000° C.

* * * * *

UNITED STATES PATENT AND TRADEMARK OFFICE
CERTIFICATE OF CORRECTION

PATENT NO. : 8,962,337 B2  Page 1 of 1
APPLICATION NO. : 13/639096
DATED : February 24, 2015
INVENTOR(S) : Michael Cleary It is certified that error appears in the above-identified patent and that said Letters Patent is hereby corrected as shown below:

In the Claims

Col. 6, Claim 7, "7. The marker system of any claim 6, wherein the medium comprises an aqueous acrylate emulsion." should read -- 7. The marker system of claim 6, wherein the medium comprises an aqueous acrylate emulsion. --

Col. 6, Claim 9, "9. A marker system of claim 1, wherein the marker further comprises a fingerprint." should read -- 9. Marker system of claim 1, wherein the marker further comprises a fingerprint. --

Signed and Sealed this
Twenty-third Day of June, 2015

Michelle K. Lee
*Director of the United States Patent and Trademark Office*